(12) United States Patent
Flavel et al.

(10) Patent No.: US 12,375,450 B2
(45) Date of Patent: *Jul. 29, 2025

(54) ENABLING PRIVATE COMMUNICATION IN PUBLIC MULTI-CLOUD ENVIRONMENTS

(71) Applicant: Salesforce, Inc., San Francisco, CA (US)

(72) Inventors: Ashley Ryan Flavel, Seattle, WA (US); William Lui, Alameda, CA (US); David Lucey, Arlington, WA (US)

(73) Assignee: Salesforce, Inc., San Francisco, CA (US)

( * ) Notice: Subject to any disclaimer, the term of this patent is extended or adjusted under 35 U.S.C. 154(b) by 969 days.

This patent is subject to a terminal disclaimer.

(21) Appl. No.: 17/167,625

(22) Filed: Feb. 4, 2021

(65) Prior Publication Data

US 2022/0141189 A1    May 5, 2022

Related U.S. Application Data

(63) Continuation-in-part of application No. 17/085,169, filed on Oct. 30, 2020, now Pat. No. 11,757,845.

(51) Int. Cl.
*H04L 9/40* (2022.01)
*H04L 67/10* (2022.01)

(52) U.S. Cl.
CPC ........ *H04L 63/0272* (2013.01); *H04L 63/029* (2013.01); *H04L 67/10* (2013.01)

(58) Field of Classification Search
CPC ... H04L 63/0272; H04L 63/029; H04L 67/10; H04L 61/4511; H04L 67/51
See application file for complete search history.

(56) References Cited

U.S. PATENT DOCUMENTS

| | | | | |
|---|---|---|---|---|
| 10,296,952 B2 * | 5/2019 | Gupte | ................ | H04L 67/1095 |
| 2011/0246997 A1 * | 10/2011 | Sitaraman | ............. | G06Q 10/06 718/103 |

(Continued)

*Primary Examiner* — Abu S Sholeman
(74) *Attorney, Agent, or Firm* — Kwan & Olynick LLP

(57) ABSTRACT

A multi-cloud private communication set-up service enables scalable private connectivity between producers and consumers residing within different public cloud environments. A producer publishes metadata information about a resource within the public cloud environment where the producer resides. The public cloud environment of the publisher is monitored for tagged metadata about new resources. Identified metadata is used to configure a producer-side private link service to a private communication link, and metadata information about the configured producer-side private link service to the private communication link is published within the public cloud environment of the producer. The metadata is identified and used to configure a communication path to the consumer based on a combination of the private communication link, leveraging native multi-VPC network connectivity capabilities between virtual private clouds residing within a public cloud environment, and virtual private network (VPN) tunnel connectivity between the public cloud environments of the producer and the consumer, so that the configured private communication path may be used by the consumer to access the resource from the producer.

19 Claims, 7 Drawing Sheets

(56) References Cited

U.S. PATENT DOCUMENTS

| | | |
|---|---|---|
| 2014/0258243 A1* | 9/2014 | Bell ................. H04L 67/306 |
| | | 707/690 |
| 2015/0007263 A1 | 1/2015 | Stewart et al. |
| 2016/0088092 A1* | 3/2016 | Cardona-Gonzalez ................. |
| | | H04L 67/141 |
| | | 709/227 |
| 2019/0102162 A1 | 4/2019 | Pitre et al. |
| 2019/0303175 A1* | 10/2019 | Irani ................ G06F 9/44521 |
| 2020/0028758 A1* | 1/2020 | Tollet ................ H04L 45/586 |
| 2020/0244756 A1* | 7/2020 | Trachy ................ G06F 21/64 |
| 2021/0409486 A1 | 12/2021 | Martinez et al. |
| 2022/0035875 A1* | 2/2022 | Gupta ................ G06F 16/907 |

* cited by examiner

600

610
Monitor, by a system residing in either a first public cloud environment (PCE) or a second PCE, the first PCE for metadata tags associated with configured producer-side private link services to services offered by producers residing in the first PCE

620
Extract, based on the monitoring, metadata from an identified metadata tag associated with a configured producer-side private link service of a service offered by a producer

630
Responsive to the system residing in the first PCE, configure a first consumer-side endpoint to the private communication link based on the extracted metadata, where the first consumer-side endpoint is located within the first PCE, and the first consumer-side private link endpoint resides within a first virtual private cloud (VPC) within the first PCE

640
Responsive to the system residing in the second PCE, configuring a second consumer-side private link endpoint to be attached to the consumer residing in the second PCE based on the extracted metadata, where the second consumer-side private link endpoint is located within the second PCE and where the second consumer-side private link endpoint resides within a second VPC within the second PCE

650
Establish connectivity between the first consumer-side private link endpoint in the first VPC and a virtual private network (VPN) tunnel, and establish connectivity between the second consumer-side private link endpoint in the second VPC and the VPN tunnel using native multi-VPC network connectivity capabilities

FIG. 6

ENABLING PRIVATE COMMUNICATION IN PUBLIC MULTI-CLOUD ENVIRONMENTS

CROSS-REFERENCE TO RELATED APPLICATIONS

This application is a continuation-in-part of co-pending U.S. application Ser. No. 17/085,169, filed on Oct. 30, 2020, which is incorporated by reference in its entirety

BACKGROUND

Field of Art

This disclosure relates in general to communication within multiple public cloud environments, and in particular to setting up scalable secure private communication links within trusted public cloud architectures.

Description of the Related Art

Cloud computing platforms have become increasingly popular in providing software, platform, and infrastructure services. For instance, public cloud service providers may provide on-demand network access to compute resources, database storage, content delivery, and other services for use by entities. As more and more entities migrate to public cloud environments, issues related to security, scalability, and reliability begin to arise.

Entities using public cloud services may communicate using public IP addresses. These entities may be susceptible to the security dangers of exposing their gateways to the Internet. For example, they may be susceptible to distributed denial of service (DDoS) attacks. Public cloud providers may offer private communication pathways by hosting virtual private clouds (VPCs) with a public cloud environment to avoid Internet exposure. However, protocols used by the public cloud providers may offer limited scalability and reliability. Thus, while using just the VPCs to establish communication between producers and consumers may address the risks of Internet exposure, it does not scale due to limitations of IP addresses.

Accordingly, conventional techniques for communicating while using the services offered by multiple public cloud providers may have limited security, scalability and reliability. Furthermore, there is a need for communication across multiple public cloud environments that is secure, reliable, and scalable.

BRIEF DESCRIPTION OF DRAWINGS

FIG. 6 is a flow chart illustrating the process for enabling a private communication pathway for accessing services by a consumer in a public cloud environment, that is a different public cloud environment than the public cloud environment in which the producer resides, according to one embodiment.

Figure 1:
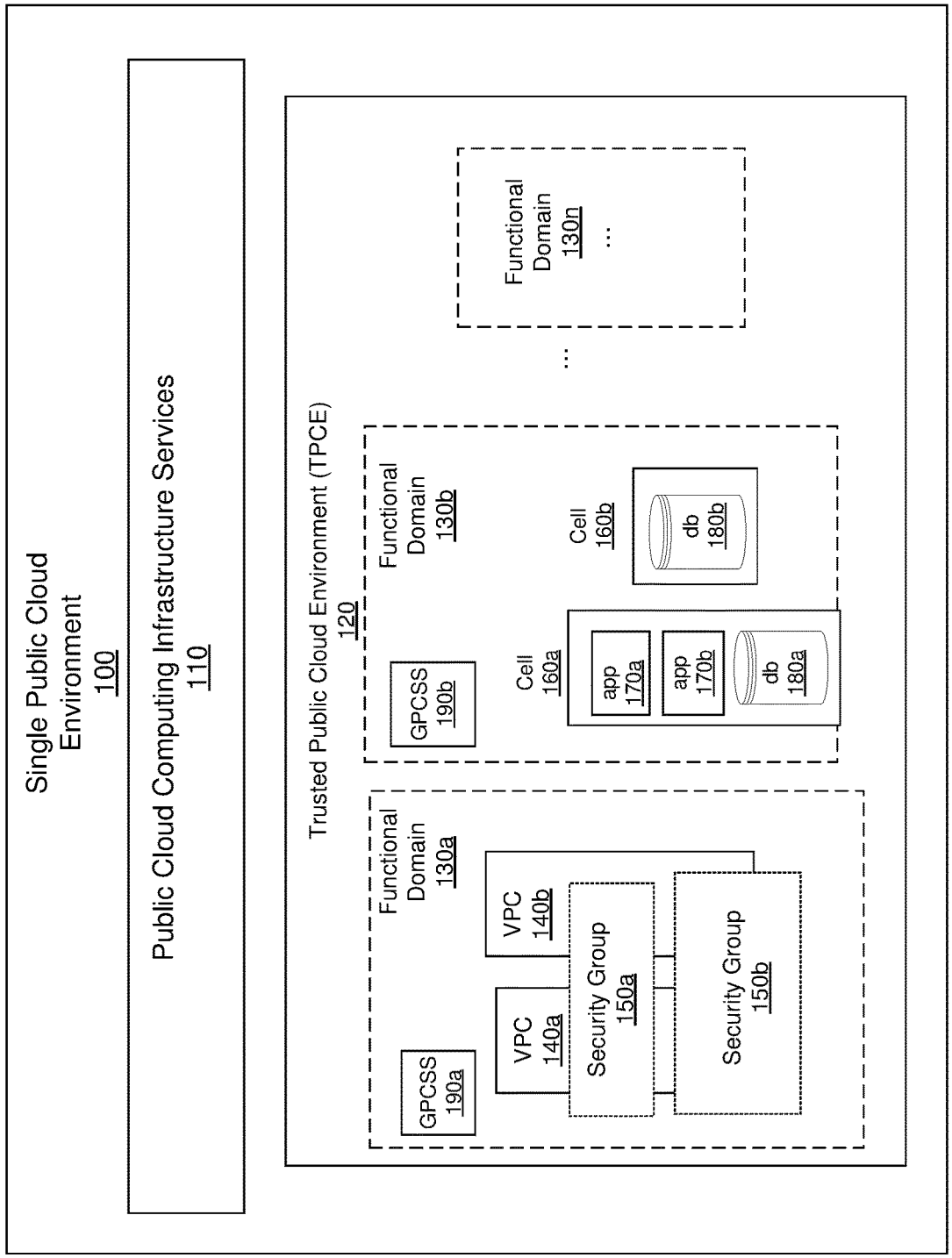
FIG. 1 depicts a block diagram illustrating functional blocks for a trusted public cloud environment that leverages a widely available public cloud environment, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral.

DETAILED DESCRIPTION

More and more entities, such as enterprises, are migrating to public cloud environments. Customers of a public cloud environment (PCE) may be producers offering a variety of services, as well as consumers of these services. A producer represents one or more processes executing on computing systems that provide services for invocation and use by other computing systems. A consumer represents the one or more computing systems that invoke a service provided by a producer. As the number of customers of public cloud environments grow, significant issues of security, scalability, and reliability arise. For example, customers using public cloud services may communicate using public IP addresses. Consider entity A and entity B that are residing in PCE-A and PCE-B, respectively. Typically, irrespective of whether PCE-A and PCE-B are the same public cloud environment or different public cloud environments, when A wishes to communicate with B, communications from A undergo network address translation within the PCE-A to an egress gateway with a public IP address, get routed through the Internet, enter PCE-B through an ingress gateway with another public IP address, and undergo network address translation once again to reach B. Using network address translation at both endpoints in a communication link may add latency that may be critical to some applications. The entry to PCE-B may be secured by network-level access controls that are put in place by the provider of PCE-B. While public cloud providers offer such access control to provide security, entities using public IP addresses may still be susceptible to the security dangers of exposing their gateways to the Internet. For example, they may be susceptible to volumetric attacks such as distributed denial-of-service (DDoS) attacks. Furthermore, the access controls offered by public cloud environments may not scale. For example, public cloud providers may limit the network access control lists (ACL) to 1000 lines per hosted virtual private cloud within a public cloud environment. As entities continue to grow, these ACL limits as well as the latency burdens may significantly impact the expansion.

Public cloud providers offer the ability for customers to communicate using private communication links within a single public cloud environment. Directly using such private communication links provided by the public cloud providers limits Internet exposure and allows the use of aliases in addressing at the endpoints of the private communication link; however, there may be limited scalability and reliability.

A particular challenge in using private communication services, such as those offered by current public cloud providers, include use of a three-way handshake to establish a private link between two customers that wish to communicate privately. For example, a producer creates a private link service to provide access to services that are offered. Each consumer requiring access to these services has to explicitly request the access to the private link service created by the producer. Subsequently, the producer has to approve the private link service access request. With expected scale of thousands of services and tens of thousands of consumers requiring access to these services, such a three-way handshake protocol sets up a significant operational challenge in terms of scalability. These limitations are further compounded when producers and consumers reside on multiple different public cloud environments. Often, services may be located in public cloud environments that are unsuited to the individual service requirements merely in order to adhere to requirements imposed on them to leverage a particular public cloud environment.

Embodiments of the global private communication set-up system described herein resolve these issues.

Embodiments relate to setting up a private communication link to a service offered by a producer residing in a public cloud environment (also referred to herein as the producer PCE) in order to provide access to a consumer residing in a different public cloud environment (also referred to herein as the consumer PCE). An entity is indicated herein as "residing" in a public cloud environment to indicate that the functionality of the entity may be based on leveraging some of the resources offered in that public cloud environment. The embodiments described herein ensure that access to reach a service is provided only when a consumer resides within a producer-defined scope. The producer-defined scope may span multiple public cloud environments. A public cloud environment is monitored for one or more metadata tags associated with a corresponding one or more services offered by one or more producers that reside in that public cloud environment. In response to the monitoring, metadata is extracted from an identified first metadata tag associated with a service offered by a producer. Extracting the metadata involves extracting field values from the identified first metadata tag, the field values being one or more of: a name of the service, a scope of exposure of the service; and parameters of an active probe test for the service. The scope of exposure of the service may include at least part of the first public cloud environment and at least part of the second public cloud environment. A producer-side private link service to a private communication link for accessing the service is configured based on the extracted metadata, where the producer-side private link service is located in the public cloud environment of the producer. A second metadata tag associated with the configured producer-side private link service to the private communication link is published in the public cloud environment of the producer.

The producer public cloud environment is monitored for the second metadata tag, and consumer-side private link endpoints are created based on the metadata extracted from the second metadata tag. The consumer-side private link endpoints may be configured within the public cloud environment of the producer as well as within a different public cloud environment to serve consumer access requirements. When the consumer-side private link endpoint and the producer-side link service reside within different logically defined domains within a single PCE, a private communication link connecting the consumer-side private link endpoint and the producer-side link service provides a connection between the two domains. Furthermore, consumer-side private link endpoints with different PCEs may be viewed as located in well-defined VPCs within each corresponding PCE. Embodiments leverage (i) virtual private network (VPN) connectivity between producer and consumer PCEs that may be established when a logical domain spanning multiple PCEs is created, and (ii) native multi-VPC network connectivity capabilities within a domain of a single public cloud environment (e.g., VPC/VNet peering capabilities within a particular PCE and a particular functional domain) to connect to the configured consumer-side private link endpoints. For example, native options for multi-VPC network connectivity capabilities include inter-region VPC peering for Amazon Web Service™, inter-region VNet peering for Azure™, and global VPCs for Google Platform Services™. These capabilities are leveraged in combination with the configured private link endpoints in embodiments described herein thereby enabling a requesting consumer residing in one public cloud environment to request for and obtain access to the service offered by a producer residing in a different public cloud environment.

Overall System Environment

FIG. 1 shows a block diagram illustrating a trusted public cloud environment (TPCE) 120 that leverages an available public cloud environment (PCE) 100, in accordance with one embodiment. Public cloud environments 100 are owned and operated by third-party providers, and the hardware, software, and supporting infrastructure is also owned and managed by the third-party cloud provider. Examples of public cloud environment 100 include, for example, Amazon Web Services™ (AWS™), Google Cloud Platform™ (GCP™), Azure™, etc.

A public cloud environment 100 offers a range of public cloud computing infrastructure services 110 that may be used on demand by a trusted public cloud environment 120. Examples of the public cloud computing infrastructure services include servers, storage, databases, networking, security, load balancing, software, analytics, intelligence, and other infrastructure service functionalities. These infrastructure services may be used by the trusted public cloud environment 120 to build, deploy, and manage applications in a scalable and secure manner. The trusted public cloud environment 120 is a trusted public cloud architecture with processing resources, networking resources, storage resources, and other service functionalities with security boundaries that are strictly enforced. An example of a trusted public cloud environment 120 is a datacenter with defined and strictly enforced security boundaries.

The trusted public cloud environment 120 has specific attributes, in accordance with some embodiments. These attributes include attributes required to use available public cloud infrastructure services 110, for example region-specific attributes or environment type specific attributes. Further attributes support security needs, availability expectations, architectural agility coupled with reliability, developer agility, distributed capabilities, and the ability to perform on multiple available public cloud environments.

The trusted public cloud environment 120 may support multiple functional domains 130*a*, 130*b*, . . . , 130*n*. Each functional domain (FD) 130 represents a set of capabilities and features and services offered by one or more computing systems that can be built and delivered independently, in accordance with one embodiment. A functional domain 130 may also be viewed a set of cohesive technical use-case functionalities offered by one or more computing systems. A functional domain 130 has strictly enforced security boundaries. A functional domain 130 defines a scope for modifications. Thus, any modifications to an entity—such as a capability, feature, or service—offered by one or more computing systems within a functional domain 130 may propagate as needed or suitable to entities within the functional domain, but will not propagate to an entity residing outside the bounded definition of the functional domain 130. When a functional domain spanning multiple public cloud environments is created, VPN tunnels may be also established by an underlying network infrastructure to establish connectivity within the functional domain between the multiple PCEs.

Each functional domain 130 may contain multiple virtual private cloud (VPC) networks, 140*a*, 140*b*, . . . , etc. Each virtual private cloud 140 is an on-demand pool of shared resources that are allocated within the functional domain 130 and provide a level of isolation between the users using the resources. VPCs within a functional domain residing within a single public cloud environment may establish connectivity with each other using native multi-VPC network connectivity capabilities available to them via underlying networking infrastructure. For example, native options for multi-VPC network connectivity capabilities include inter-region VPC peering for Amazon Web Service™, inter-region VNet peering for Azure™, and Global VPCs for Google Platform Services™. Connectivity may be provided to two VPCs residing within different PCEs through VPNs. Each functional domain 130 may also contain multiple security groups, 150*a*, 150*b*, . . . , etc. Each security group 150 represents a declarative model for enforcing network segmentation. Each security group 150 includes entities with similar risk service profiles collected into a single security group with explicit declarative policy brokering connectivity between the groups.

A functional domain 130 may also contain one or more cells, 160, 160*b*, . . . , etc. A cell 160 represents a collection of services that scale together, and that may be sharded. These services may be applications 170*a*, 170*b*, . . . , etc., and/or databases 180*a*, 180*b*, . . . , etc.

In embodiments described herein, a functional domain 130 may also contain an instance of a global private communication set-up system (GPCSS) 190*a*, 190*b*, . . . , that represents one or more computing systems executing a time- or event-driven process within the functional domain. In some embodiments, each instance of a global private communication set-up system 190 has producer-specific functionality as well as consumer-specific functionality. When the producer and the consumer both reside within a single public cloud environment, the global private communication set-up system 190 sets up private communication links for consumers within one functional domain to access services offered by producers that are executing within different functional domains from the consumer. When the producer and the consumer each reside within different public cloud environments, then the global private communication set-up system 190 facilitates a private communication pathway between the producer and the consumer. The private communication pathway between the producer and the consumer is configured using a private communication link set up within the public cloud environment of the producer in combination with leveraging native multi-VPC network connectivity capabilities within a functional domain of a single public cloud environment and VPN tunnel connectivity between the two public cloud environments, so that the configured communication pathway may be used by the consumer residing in one public cloud environment to access the resource from the producer residing in a different public cloud environment.

The establishment of a private communication link between a producer and a consumer residing within a single public cloud environment is first described below. This is followed by a description of a global private communication set-up system that facilitates private communication between a producer and a consumer residing in different public cloud environments.

Private Communication Set-Up Service in a Single Public Cloud Environment

Figure 2:
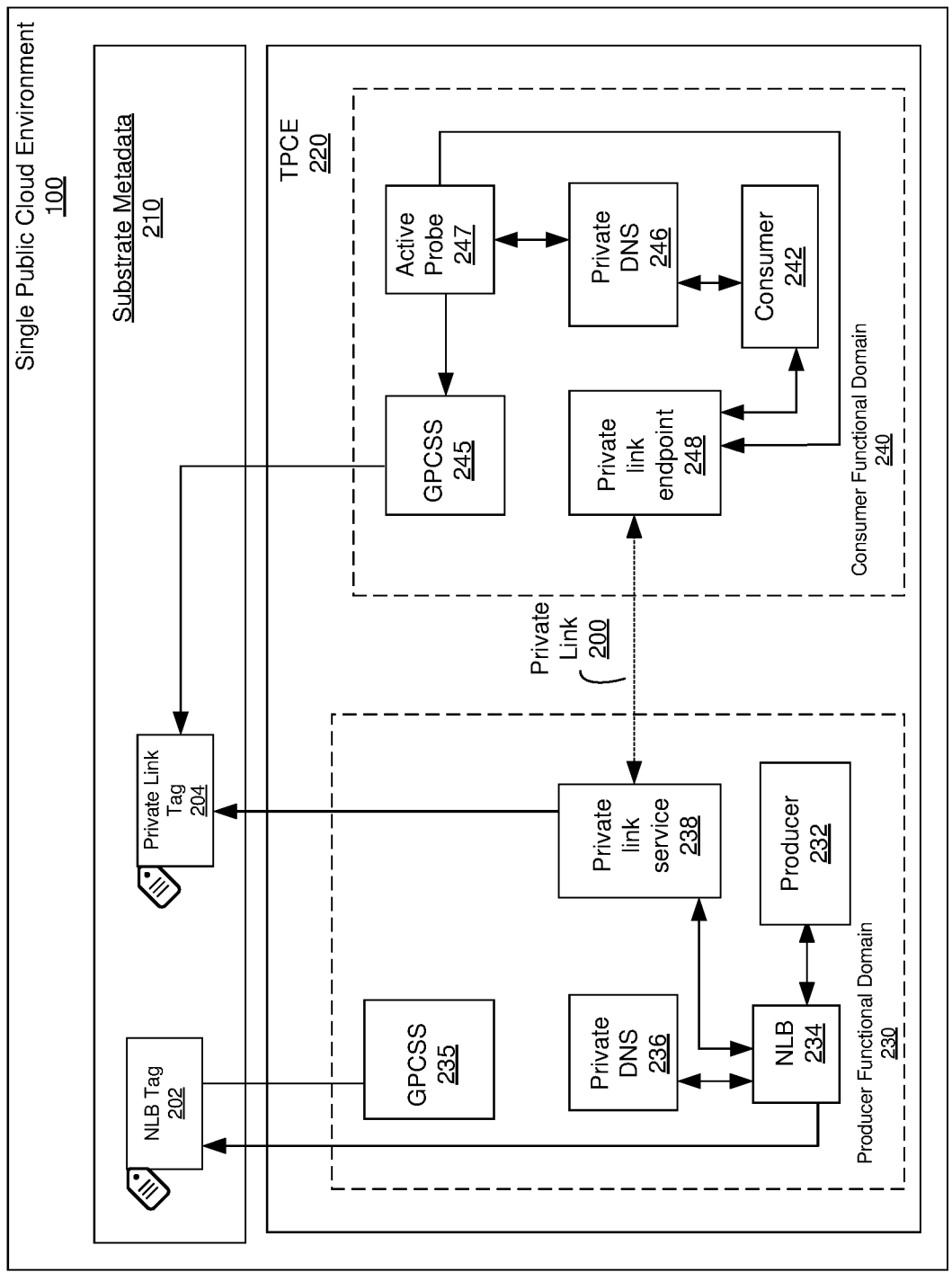
FIG. 2 depicts an exemplary workflow illustrating private communication between a producer and a consumer, with both the producer and the consumer in a trusted public cloud environment that resides in a single public cloud environment, according to one embodiment.

FIG. 2 depicts a use-case example of a global private communication set-up system, such as global private communication set-up system 190 depicted in FIG. 1, in accordance with one embodiment. The example shown in FIG. 2 may be performed in a trusted public cloud environment such as trusted public cloud environment 120 that resides within a public cloud environment such as public cloud environment 100 depicted in FIG. 1. FIG. 2 depicts operational functionalities of an instance global private communication set-up system 235 of the global private communication set-up system 190 that is executing in the functional domain 230 of a producer 232 and an instance global private communication set-up system 245 of the global private communication set-up system 190 that is executing in the functional domain 240 of a consumer 242. In this depiction, both producer and consumer reside in a single public cloud environment 100.

A public cloud environment 100 offers substrate infrastructure services 110 as depicted in FIG. 1. The public cloud infrastructure services 110 include processing resources, networking resources, storage resources, and other service functionalities. Metadata associated with substrate services may be exposed in substrate metadata 210. Examples of substrate metadata 210 include tags or labels that may be attached to resources/services created by customers of the public cloud environment. For example, AWS™ allows customers to attach a tag to their AWS™ resources. A tag may include one or more customer-defined keys/fields with one or more optional values for managing, searching for, and filtering resources. These tags and the associated metadata in the key/field values may be displayed in the public cloud environment.

A functional domain with a producer offering a service, i.e., producer functional domain 230, contains a producer 232 that creates a service for use by a consumer. In accordance with some public cloud environment requirements, producer 232 may attach a network load balancer (NLB) 234 so that all communication directed towards producer 232 for the created service from either within the producer functional domain 230 or from outside the producer functional domain 230 is directed via the NLB 234. In other public cloud environment environments, it may be possible to directly address producer 232 without being directed via an NLB 234. While the following description is based on a public cloud environment requiring a producer to be attached to an NLB, in embodiments where a public cloud environment does not require an NLB to be attached to a producer, the service may replace all actions performed with respect to an NLB attached to a producer with actions performed directly with respect to the producer.

In accordance with some embodiments, while offering a service, producer 232 creates a certificate with a well-structured name. For example, a well-structured name attached to the certificate may be of the form:

<service>.<namespace>.<producer_FD>
<producer_TPCE>.spcnme.net The use of a well-structured name and certificates enforces trusted and secure connectivity between the producer 232 and a consumer 242. The producer 232 also tags the offered service, i.e., NLB 234, with metadata information associated with the offered service. The metadata information may include the name and the scope of exposure being offered by the producer 232 regarding the service. For example, the scope may specify exposure to all functional domains within the trusted public cloud environment such as trusted public cloud environment 120 in FIG. 1, or may specify exposure to all functional domains within a region of type device/test/perf, etc. The metadata information may also include parameters of an active probe test for configuring an active probe for monitoring the service being offered to consumers who are accessing the service from the producer. The metadata information is exposed by producer 232 as NLB tag 202 in the substrate metadata 210. Subsequently, producer 232 may inform consumers to use the offered service by using a well-structured name, for example:

<service>.<namespace>.<producer_FD>
<producer_TPCE>.spcnme.net to connect to the offered service.

For example, producer 232 may tag NLB resource 234 with a private communication link tag ("PrivateCommunicationLink" tag) NLB tag 202. The tagging may be performed by producers 232 dynamically at runtime, or in in the course of delivering infrastructure as code to build, provision, deploy and manage the trusted public cloud environment 220. In some embodiments, the tag may be represented as a json blob (max size 255 chars). In some embodiments, the tag may have extra characters and may comprise multiple tags or link to object storage provided by the public cloud environment (e.g., AWS™ storage in the form of an S3 blob). An example of a private communication link tag developed for the Azure™ public cloud environment is depicted below. The metadata information is entered in the depicted field values:

---
PrivateCommunicationLink tag
---
{
  "servicename": "Vault", #name of service
  "scope": "TPCE", #scope that producer wants for service
  "DNS": "vault.vault.vaultFD.dev-aws-uswest2.spcnme.net", #DNS name
  "Healthcheck": "/keepalive", #endpoint that will be subjected to active probe to monitor performance
  "Azure": #any PCE specific private link configurations required
  {
    "NATIPs": "2",
  }
}

---

The above example includes public cloud environment specific parameter values such as "Azure" and related parameter values for the Azure™ environment, such as a "NATIPs" value that may specify the number of IP addresses from which a server may receive requests. Embodiments described herein provide capabilities that may be applied to various public cloud environments, for example, Amazon Web Services™ (AWS™), Google Cloud Platform™ (GCP™) Azure™, etc.

According to some embodiments, an instance global private communication set-up system 235 of the global private communication set-up system that is executing in producer functional domain 230 may monitor all NLB resources for a new or updated private communication link tag (e.g., "PrivateCommunicationLink" tag shown above). In some embodiments, the global private communication set-up system 235 may be configured to perform the monitoring periodically at a prespecified frequency. In some embodiments, the global private communication set-up system 235 may be configured to receive notifications when a new or updated NLB tag is created. An updated NLB tag is one where one or more field values of the tag have changed. The global private communication set-up system 235 extracts the metadata (i.e., the field values) from new or updated NLB tag 202 and configures a producer-side private link service 238 to a private link 200 that is offered by the public cloud environment. The configured producer-side private link service 238 is based on the extracted metadata. The global private communication set-up system 235 attaches the newly configured producer-side private link service 238 to NLB 234. The global private communication set-up system 235 then creates a private link tag 204 with metadata information. The private link tag 204 is attached to the private communication link with the configured producer-side private link service 238 and is exposed as private link tag 204 in the substrate metadata 210. The metadata information provided in the private link tag 204 is used to configure a consumer-side private link endpoint on a consumer functional domain, such as consumer functional domain 240. An example private link tag 204 (e.g., "PrivateLink" tag) is depicted below with metadata information in the following field values:

---
PrivateLink tag
---
{
  "servicename": "Vault"
  "scope": "TPCE"
  "DNS": "vault.vault.vaultFD.dev-aws-uswest2.abcdef.net"
  "Healthcheck": "/keepalive
}

---

The global private communication set-up system 235 requires a certificate on the service side. As previously noted, this certificate is created by the producer 232 when offering the service. The name specified on the certificate, for example, "spcnme.net" is used by every consumer requiring access to the services. The global private communication set-up system 235 configures a Private DNS 236 based on the prespecified well-structured name. The global private communication set-up system 235 creates a private DNS record in Private DNS 236 so that all access to NLB 234 within producer functional domain 230 is through the created producer-side private link service 238. Thus, any consumer that may reside within the producer functional domain 230 communicates with NLB 234 using the well-structured specified name and through the configured producer-side private link service 238. For a consumer that resides in a consumer functional domain 240 that is not the same as the producer functional domain 230, the communication with producer 232 via NLB 234 is described in the following paragraphs.

In some embodiments, an instance global private communication set-up system 245 of the global private communication set-up system executes in consumer functional domain 240 within which a consumer 242 is located. The global private communication set-up system 245 monitors the substrate metadata for a new or updated private link tag (e.g., "PrivateLink" tag shown above). In some embodiments, the global private communication set-up system 245 may be configured to perform the monitoring periodically at a prespecified frequency. In some embodiments, the global private communication set-up system 245 may be configured to receive notifications when a new or updated private link tag 204 is created. An updated private link tag 204 is one where one or more field values of the tag have changed. The global private communication set-up system 245 extracts the metadata (i.e., the field values) from the new or updated private link tag 204. The global private communication set-up system 245 configures a consumer-side private link endpoint 248 at the consumer functional domain end of the private link 200 offered by the public cloud environment based on the extracted metadata from the private link tag 204.

The global private communication set-up system 245 configures a Private DNS 246 based on the prespecified name extracted from the metadata in the private link tag 204. The global private communication set-up system 245 creates a private DNS record in Private DNS 246 so that all access to NLB 234 within the producer functional domain 230 is through the created consumer-side private link endpoint 248 in consumer functional domain 240. The global private communication set-up system 245 attaches the consumer-side private link endpoint 248 to the consumer 242. Thus, any consumer that may reside within the consumer functional domain 240 may communicate with NLB 234 using this specified name, and through the configured consumer-side private link endpoint 248. The global private communication set-up system 235 may specify the consumer-side private link endpoints 248 of specific consumers 242 as permitted to establish connections or may auto-approve any connections established from the consumer side. In some embodiments, the global private communication set-up system 235 may specify environment-specific consumers and producer services, such as, for example, consumers residing within a particular specified "dev" environment may establish connections with the producer services in the "dev" environment.

The global private communication set-up system 245 configures an active probe 247 based on the parameters extracted from the private link tag 204. Active probe 247 obtains telemetry data regarding jitter, successes and failures in the consumer-side private link endpoint creation, latency statistics, etc. Active probe 247 sends the obtained telemetry data to the global private communication set-up system 245. The global private communication set-up system 245 may store the logged telemetry data in a local data store and periodically send the telemetry data as needed for further network infrastructure management within the consumer functional domain 240, or elsewhere. In some embodiments, the global private communication set-up system 245 may send the telemetry data periodically at a configurable frequency or at a default frequency.

Each time a new consumer seeks access to the services offered by the producer 232, the global private communication set-up system instance that is running in the corresponding consumer functional domain automatically does the following: create a consumer-side private link endpoint based on prior monitoring for private link tags 204 by the consumer component of the global private communication set-up system instance running within the corresponding consumer functional domain; configure the Private DNS in the consumer functional domain with the DNS record so that all access to NLB 234 within the producer functional domain 230 for the new consumer is through the created consumer-side private link endpoint, thereby attaching the consumer to the created consumer-side private link endpoint. Thus, each time a new producer offers services, the global private communication set-up system on the producer functional domain operates once to set up the producer-side private link service 238 as described above. For each new consumer require access to the services offered by the producer, a global private communication set-up system instance executing in the functional domain of the consumer establishes the consumer-side private link endpoint on the consumer functional domain for communicating with the producer-side private link service that has been set up in the functional domain of the producer. Thus, embodiments of the global private communication set-up system avoid the conventional three-way handshake protocol that is performed by a producer and every consumer each time they wish to communicate in conventional systems, and thereby resolve the scalability issues of the conventional three-way handshake protocol. Furthermore, the coordinated secure communication between producers and consumers is automated.

Global Private Communication Set-Up Service in Multi-Public Cloud Environments

Figure 3:
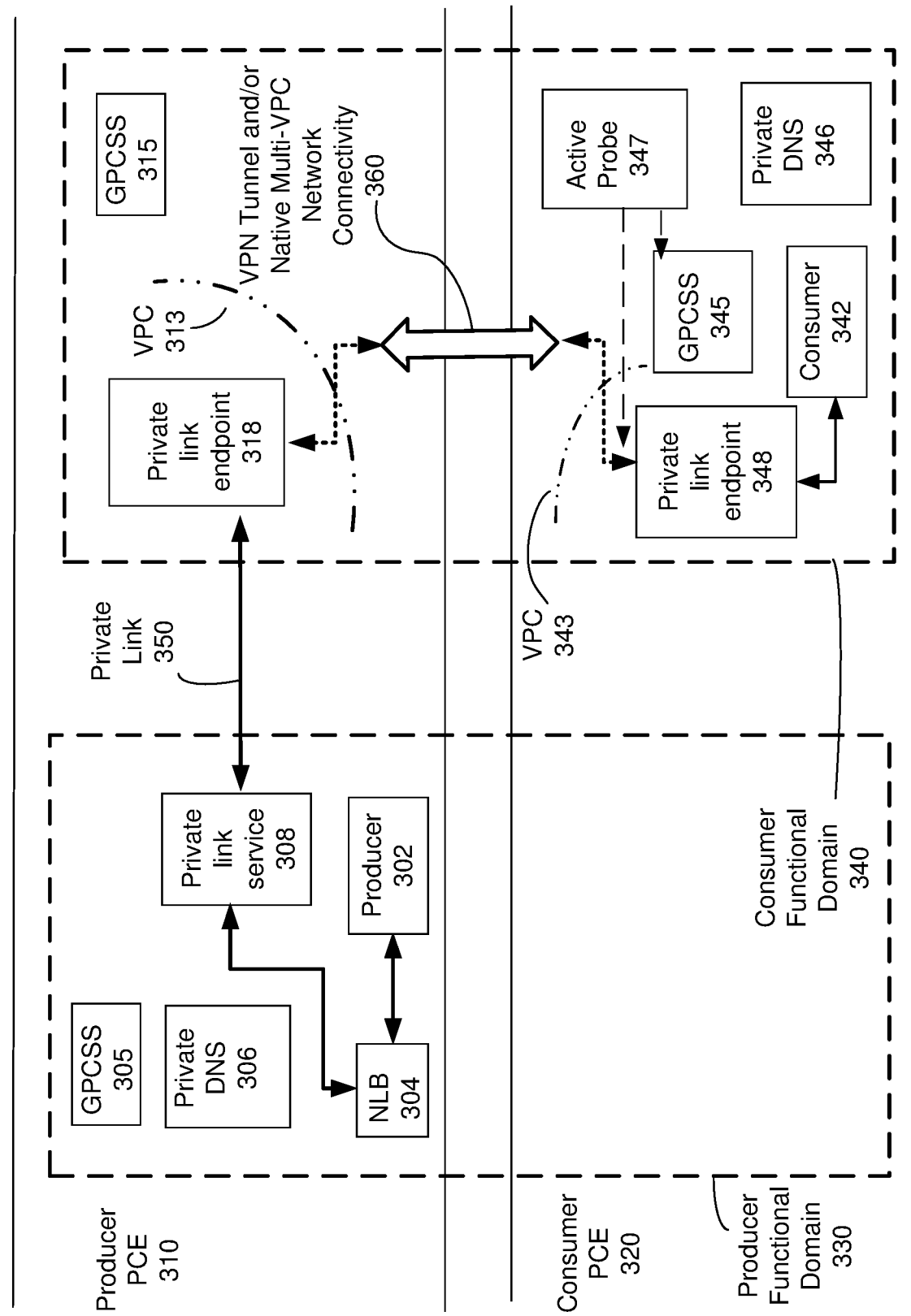
FIG. 3 depicts an exemplary workflow illustrating private communication between a producer and a consumer in trusted public cloud environments that leverage multiple public cloud environments, according to one embodiment.

FIG. 3 depicts a use-case example of a global private communication set-up system, such as global private communication set-up system 235 and global private communication set-up system 245 as depicted in FIG. 2, in accordance with one embodiment. While FIG. 2 depicts a use case of the global private communication set-up in one public cloud environment, FIG. 3 depicts a use case that is expanded to include the operational functionalities described in FIG. 2 and to facilitate private, reliable, and scalable communication between a producer and a consumer that each reside in different functional domains as well as in different public cloud environments. The example shown in FIG. 3 may be performed in trusted public cloud environments such as trusted public cloud environment 120 that resides within a public cloud environment such as public cloud environment 100 depicted in FIG. 1.

Public cloud environments producer PCE 310 and consumer PCE 320 offer substrate infrastructure services 110 as depicted in FIG. 1, including processing resources, networking resources, storage resources, and other service functionalities. Metadata associated with substrate services may be published in substrate metadata, as depicted in FIG. 1 and FIG. 2. A functional domain may span multiple public cloud environments. When a functional domain is created connecting multiple public cloud environments, connectivity may be established between the public cloud environments by configuring one or more VPNs connecting the PCEs within the functional domain. Furthermore, multiple VPCs may exist within a functional domain in a single PCE (e.g., VPCs 140a and 140b in FIG. 1) and may use native multi-VPC network connectivity capabilities available to them via underlying networking infrastructure to communicate with each other.

As depicted, producer functional domain 330 and consumer functional domain 340 each span producer PCE 310 and consumer PCE 320. In accordance with some public cloud environment requirements, producer 302 may attach a network load balancer (NLB) 304 so that all communication directed towards producer 302 for the created service is directed via the NLB 304.

As described with respect to global private communication set-up system 235 in FIG. 2, an instance of the global private communication set-up system, GPCSS 305, is executing in the producer PCE 310 and producer functional domain 330. GPCSS 305 sets up a private link service 308 and configures private DNS 306 by creating a private DNS record based on metadata tags that are published by the producer 302 in the substrate of the producer PCE 310 for a named service offered by the producer 302.

Similarly, as described with respect to global private communication set-up system 245 in FIG. 2, an instance of the global private communication set-up system that is executing in the producer PCE 310 and consumer functional domain 340, i.e., GPCSS 315, configures a consumer-side private link endpoint 318. The configured consumer-side private link endpoint 318 resides inside VPC 313.

Similarly, as described with respect to global private communication set-up system 245 in FIG. 2, an instance of the global private communication set-up system that is executing in the consumer PCE 320 and consumer functional domain 340, i.e., GPCSS 345, is configured to monitor substrates of various different public cloud environments for new or updated metadata tags that are published in association with private link services offered by one or more producers in the different public cloud environments. Thus, global private communication set-up system 345 identifies and extracts, based on monitoring, metadata tags published in the producer PCE 310 substrate regarding the private link service 308. The extracted metadata may include the scope of exposure being offered by the producer regarding the service. For example, the scope may specify exposure of the service offered by the producer 302 to a consumer residing in PCE 320 and consumer functional domain 340 in FIG. 3. Subsequently, GPCSS 345 configures a consumer-side private link endpoint 348. GPCSS 345 also creates a private DNS record and configures a private DNS 346 based on the created private DNS record. The configured consumer-side private link 348 resides in VPC 343.

Embodiments leverage existing virtual private network (VPN) tunnels or native multi-VPC network connectivity capabilities between producer and consumer PCEs to establish connectivity between configured consumer-side private link endpoints. Thus, in FIG. 3, VPN tunnel 360 provides connectivity between producer PCE 310 and consumer PCE 320 when consumer functional domain 340 is created. Furthermore, native multi-VPC network connectivity capabilities between the VPN tunnel 360 and VPC 313 within producer PCE 310 and consumer FD 340 provides connectivity to private link endpoint 318, while native multi-VPC network connectivity capabilities between the VPN tunnel 360 and VPC 343 within consumer PCE 320 and consumer FD 340 provides connectivity to private link endpoint 348.

Thus, embodiments describe herein ensure that all access by consumer 342 to NLB 304/producer 302 is through the configured private link endpoints 348 and 318, and configured private link service 308, further leveraging native multi-VPC network connectivity capabilities as well as VPN tunnel 360 connectivity. Thus, any consumer that may reside within the consumer PCE 320 and consumer functional domain 340 may communicate with NLB 304 using the specified name, and through the configured communication path. The global private communication set-up system 305 may specify the consumer-side private link endpoints 318 of specific consumers 342 as being permitted to establish connections or may auto-approve any connections established from the consumer side. In some embodiments, the global private communication set-up system 305 may specify public cloud environment-specific consumers. Multiple private link endpoints may be configured within a VPC in one PCE and connectivity to another VPC in another PCE may be established for all of these endpoints using a single, possibly multiplexed VPN 360.

The global private communication set-up system 345 configures an active probe 347 based on the extracted metadata parameters. Active probe 347 obtains telemetry data regarding jitter, successes and failures in the endpoint creation, latency statistics, etc. Active probe 347 sends the obtained telemetry data to the global private communication set-up system 345. The global private communication set-up system 345 may store the logged telemetry data in a local data store and periodically send the telemetry data as needed for further network infrastructure management within the consumer functional domain 340, or elsewhere. In some embodiments, the global private communication set-up system 345 may send the telemetry data periodically at a configurable frequency or at a default frequency.

System Architecture

Figure 4:
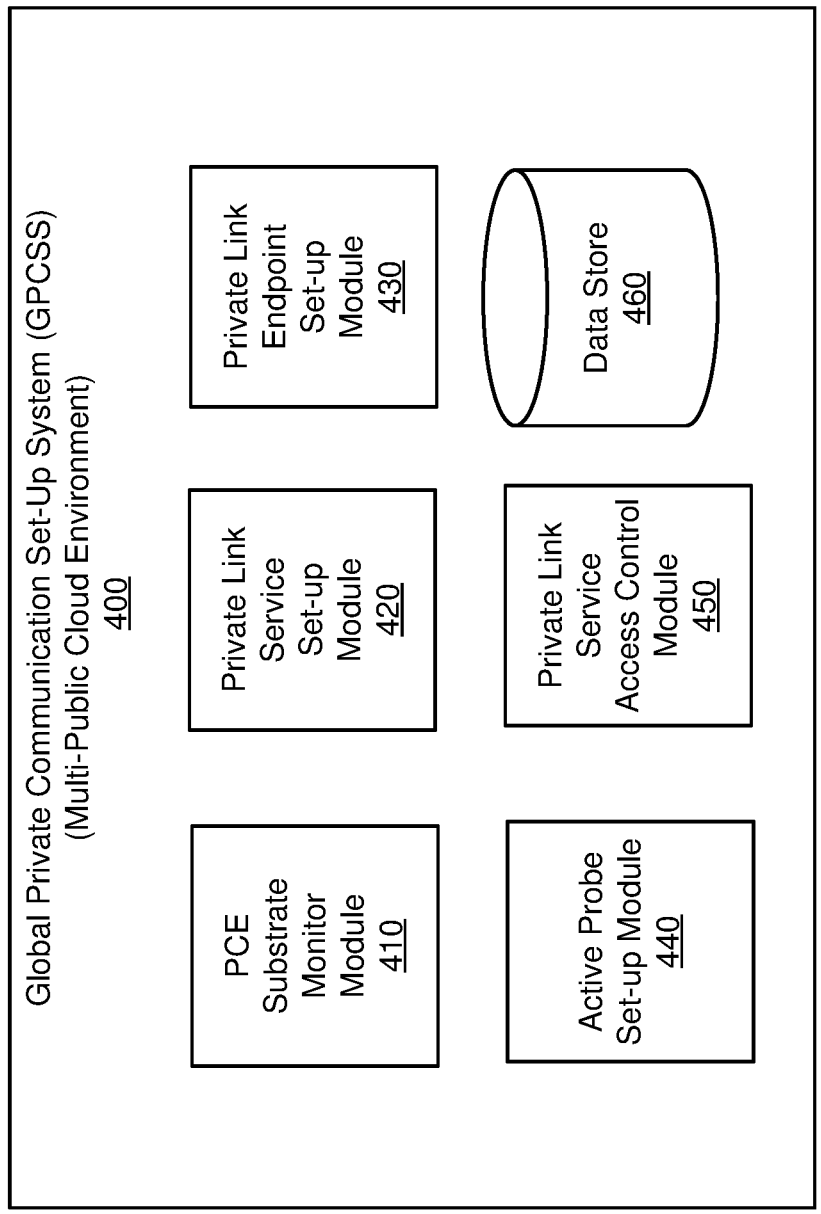
FIG. 4 is a block diagram illustrating components of a global private communication set-up system in trusted public cloud environments operating in at least two different public cloud environments, according to one embodiment.

FIG. 4 is a block diagram illustrating modules of the global private communication set-up system 400 according to one embodiment. The global private communication set-up system 400 includes a PCE substrate monitor module 410, a private link service set-up module 420, a private link endpoint setup module 430, an active probe set-up module 440, a private link service access control module 450, and a data store 460. Alternative configurations of global private communication set-up system 400 may include different and/or additional modules. Functionality that is indicated as being performed by a particular module may be performed by other modules than those indicated herein. Furthermore, steps of any processes described herein can be performed in an order different from that illustrated herein.

The modules of global private communication set-up system 400 may execute in a trusted public cloud environment such as a trusted public cloud environment 120 that resides within a public cloud environment such as public cloud environment 100 depicted in FIG. 1. The global private communication set-up system 400 may be used to perform the operational functionalities described in FIG. 2 as being performed by instances of the global private communication set-up system 235 and 245, and the operational functionalities described in FIG. 3 as being performed by instances of the global private communication set-up systems 305, 315, and 345. Each instance of the global private communication set-up system 400 may reside and execute in functional domains and public cloud environments within which service producers and service consumers respectively reside in order to set up the private communication paths needed for secure and reliable communication between producers and/consumers in the respective functional domains and PCEs.

The PCE substrate monitor module 410 located in an instance of the system 400 in the producer PCE and the producer functional domain (e.g., the module 410 located within GPCSS 305 in FIG. 3) monitors the substrate of the producer PCE infrastructure for new or updated tagged metadata that are published in association with services offered by producers in the PCE as part of substrate metadata. Such new or updated tagged metadata may publish information regarding a new or updated service offered by a producer. This monitoring is for the purpose of obtaining information for configuring a private link service to a private link in the producer functional domain and the producer PCE so that a consumer may reliably and securely obtain access to the producer's services.

The PCE substrate monitor module 310 located in an instance of the system 400 in the producer PCE and the consumer functional domain (e.g., the module 410 located within GPCSS 315 in FIG. 3) monitors the substrate of the producer PCE infrastructure for new or updated tagged metadata that are published in association a producer-side private link service that has been configured within the PCE and functional domain of the producer to obtain access to a service offered by the producer. Such new or updated tagged metadata may publish information regarding a new or updated private link service offered by a producer. This monitoring is for the purpose of obtaining information for configuring a consumer-side private link endpoint suitably in the consumer functional domain and the producer PCE so that a consumer may reliably and securely obtain access to the producer's services.

The PCE substrate monitor module 410 located in an instance of the system 400 in the consumer PCE and the consumer functional domain (e.g., the module 410 located within GPCSS 345 in FIG. 3) monitors the substrate of the producer PCE infrastructure for new or updated tagged metadata that are published in association with private link services offered by producers in the producer PCE as part of substrate metadata. This monitoring is for the purpose of obtaining information for configuring a consumer-side private link endpoint suitably in the consumer functional domain and the consumer PCE so that a consumer may reliably and securely obtain access to the producer's services.

Examples of substrate metadata that the public cloud environment substrate monitor module 410 monitors for include tags or labels that may be attached to services (such as services offered by producers) or created producer-side private link service configurations. In some embodiments, a service offered by a producer may be tagged with a private communication link tag "PrivateCommunicationLink" tag (e.g., NLB tag 202 in FIG. 2). In some embodiments, a private link endpoint may be tagged with a "PrivateLink" tag (e.g., NLB tag 204 in FIG. 2). A tag may consist of a one or more customer-defined keys or fields with one or more optional values for managing, searching for, and filtering the offered services. The metadata information exposed by the PrivateCommunicationLink tag and the PrivateLink tag include a name that is specified by the producer, and that is used by every consumer requiring access to the offered service. The metadata may include the scope of exposure being offered by the producer regarding the service. For example, the scope may specify exposure to all functional domains within the trusted public cloud environment such as trusted public cloud environment 120 in FIG. 1, or may specify exposure to all functional domains within a region of type device/test/perf, etc. The metadata information may also include parameters of an active probe test to be performed in a consumer functional domain for obtaining telemetry data regarding access to the service by a consumer.

Examples of a PrivateCommunicationLink tag and a PrivateLink tag are depicted in association with FIG. 2 above. These are example tags. Other examples may include different names, values, fields, and parameters. These examples illustrate how a tagging system that may be offered in a public cloud environment may be used to expose data for use in setting up private communication between customers in a public cloud environment.

In some embodiments, module 410 may monitor for a new or updated "Private CommunicationLink" tag or "PrivateLink" tag. In some embodiments, module 410 may be configured to perform the monitoring periodically at a prespecified frequency. In some embodiments, the module 410 may be configured to additionally or alternately receive notifications when a new or updated tag (i.e., PrivateCommunicationLink tag or PrivateLink tag) is exposed in the metadata. An updated tag may be described as a tag where one or more field values of the tag have changed. In some embodiments, the tag may consist of a json blob (max size 255 chars). In some embodiments, the tag may have extra characters and may comprise multiple tags or link to object storage provided by the public cloud environment. Upon identifying that there is a new or updated tag, module 410 extracts the metadata (i.e., the field values) from the identified new or updated tag. In some embodiments, module 410 may send the extracted metadata information to the private link service set-up module 420. In some embodiments, the PCE substrate monitor module 410 may store the extracted metadata information at the data store 460.

The private link service set-up module 420 located in an instance of the system 400 in the producer PCE and the producer functional domain (e.g., located within GPCSS 305 in FIG. 3) configures a private communication link service (e.g., private link service 308 in FIG. 3) within the functional domain and PCE of the producer. The configured private link service is based on the extracted metadata of an identified new or updated tag published in association with a service that is offered by the producer. Module 420 may retrieve the extracted metadata from the data store 460 or it may receive the extracted metadata from the PCE substrate monitor module 410. The metadata (e.g., the extracted metadata from a new or updated PrivateCommunicationLink tag that is extracted by module 410) is used to configure the producer-side private link service in the producer functional domain and producer PCE. Module 420 uses the name (specified by the producer for the service) that is in the exposed metadata to create a private DNS record associated with the name. Module 420 configures a private DNS module in the producer functional domain based on the prespecified name in the extracted metadata. When configuring the producer-side private link service, module 420 creates a private link tag (e.g., the PrivateLink tag) that is attached to the newly created producer-side private link service in the producer functional domain and producer PCE, and includes metadata information about this producer-side private link service. Module 420 then publishes the private link tag in the substrate metadata of the producer PCE.

If a producer wishes to remove a private link to a service they offer, this is done by explicitly changing a value of the scope in the PrivateCommunicationLink tag for the service exposed by the producer in the substrate. In some embodiments, the field value for the scope parameter may be changed (e.g., to "none" or "null"). Changing the scope parameter rather than just removing the tag exposure in the substrate reduces the possibility of inadvertently deleting an existing private link by accidentally deleting an exposed tag. The private link service setup module 420 will propagate this modified value of the scope parameter to the exposed PrivateLink tag that is linked to the producer-side private link service. The modified value of the scope parameter will be subsequently extracted as part of the metadata by the instance of the global private communication set-up system 400 that is executing in the functional domain of the consumer. This will ensure that the metadata information regarding a "deleted" private link will be propagated to all consumer functional domains. Furthermore, all changes to tag field values are logged and sent to the data store 460.

The private link endpoint set-up module 430 located in an instance of the system 400 in the producer PCE and the consumer functional domain (e.g., located within GPCSS 315 in FIG. 3) configures a consumer-side private link endpoint of the private link service based on the extracted metadata from the private link tag. Module 430 may retrieve the extracted metadata from the data store 460 or it may receive the extracted metadata from the PCE substrate monitor module 410. The metadata (e.g., the extracted metadata from a new or updated PrivateLink tag that is extracted by the PCE substrate monitor module 410) is used to configure the consumer-side private link endpoint in the consumer FD and producer PCE. In some embodiments, the private link endpoint setup module 430 may store the information regarding the configured consumer-side private link endpoint in the data store 460.

The private link endpoint set-up module 430 located in an instance of the system 400 in the producer PCE and the consumer functional domain (e.g., located within GPCSS 315 in FIG. 3) further configures the consumer-side private link endpoint to be located within a VPC within the producer PCE and the consumer functional domain so that the endpoint is accessible through native multi-VPC network connectivity capabilities from an existing VPN tunnel that provides connectivity between the producer PCE and the consumer PCE within the consumer functional domain.

The private link endpoint set-up module 430 located in an instance of the system 400 in the consumer PCE and the consumer functional domain (e.g., located within GPCSS 345 in FIG. 3) configures a consumer-side private link endpoint of the private link service based on the extracted metadata from the private link tag published by the private link service setup module. Module 430 may retrieve the extracted metadata from the data store 460 or it may receive the extracted metadata from the PCE substrate monitor module 410. The metadata (e.g., the extracted metadata from a new or updated PrivateLink tag that is extracted by the PCE substrate monitor module 410) is used to configure the consumer-side private link endpoint in the consumer PCE and consumer FD. In some embodiments, the private link endpoint setup module 430 may store the information regarding the configured consumer-side private link endpoint in the data store 460.

The private link endpoint set-up module 430 located in an instance of the system 400 in the consumer PCE and the consumer functional domain (e.g., located within GPCSS 345 in FIG. 3) further configures the consumer-side private link endpoint to be located within a VPC within the consumer PCE and the consumer functional domain so that the endpoint is accessible through native multi-VPC network connectivity capabilities from an existing VPN tunnel that provides connectivity between the consumer PCE and the producer PCE within the consumer functional domain.

The active probe set-up module 440 located in the instance of the system 400 in the consumer PCE and the consumer functional domain (e.g., located within GPCSS 345 in FIG. 3) configures an active probe based on extracted metadata from the private service link tag (e.g., the "Healthcheck" parameter values in the PrivateLink tag depicted with respect to FIG. 2) in the functional domain of the consumer. The module 440 may retrieve the parameters for configuring the active probe from stored metadata information in the data store 460 and configure the active probe based on the retrieved parameter values. The configured active probe determines telemetry data regarding successes and failures in the private link endpoint creation, latency statistics, etc., and sends the telemetry data to the data store 460.

The private link access control module 450 located in the instance of the system 400 in the producer PCE and the producer functional domain (e.g., located within GPCSS 305 in FIG. 3) controls access to the service offered by a producer based on consumer subscriptions to the producer service. The module 450 controls access by ensuring that only consumers based on valid consumer subscriptions are whitelisted (permitted access) explicitly by a producer. For example, there may be multiple types of functional domains defined within the trusted public cloud environment, and the whitelisting may be able to specify permissions such as "allow all consumers from 'dev' and 'test' type functional domains" or "allow all consumers from 'prod' functional domain." The module 450 may be viewed as taking control of access to a producer's service and bypassing the network access control service to public IP addresses provided by public cloud providers (e.g., ACL list limits of 1000 lines per hosted virtual private cloud within a public cloud environment).

The data store 460 stores information for the global private communication set-up system 400. The stored data may in association with configuring a private communication link for a consumer to access a service offered by a producer. The stored data includes metadata information extracted from tags such as a PrivateCommunicationLink tag or a PrivateLink tag exposed in substrate metadata. The stored metadata information may include the name and the scope of exposure being offered by a producer regarding an offered service. Furthermore, all changes made to tag field values (by the producer, etc.) are logged and stored in the data store 460. The stored metadata information may also include parameters of an active probe test subsequently used to configure an active probe for monitoring the service being offered to consumers accessing a service from a producer. The data store 460 may store telemetry data from a configured active probe executing in the functional domain of a consumer of a service. The logged telemetry data may be periodically retrieved from the data store 460 as needed for further network infrastructure management within the consumer functional domain.

The data store 460 is a memory, such as a read only memory (ROM), dynamic random-access memory (DRAM), static random-access memory (SRAM), or some combination thereof. In some embodiments, the various modules of the global private communication set-up system 400 may pass various data values directly to each other. In some embodiments, the various modules of the global private communication set-up system 400 may store data values in the data store 460 and retrieve data values as needed from the data store 460.

Producer End Process

Figure 5:
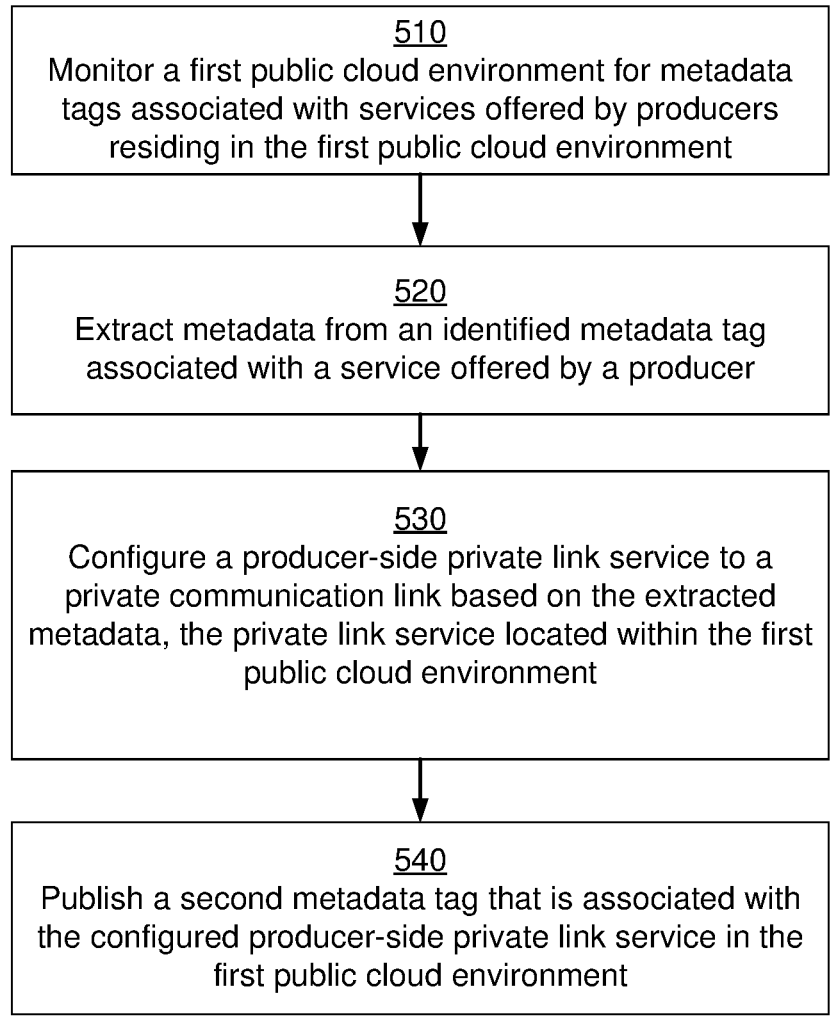
FIG. 5 is a flow chart illustrating the process for enabling a private communication pathway to services offered by producer residing in a public cloud environment, according to one embodiment.

FIG. 5 is a flow chart illustrating the overall process for setting up a private communication link to a resource offered by a producer residing in a public cloud environment (i.e., the producer PCE) using a global private communication set-up system 400 (shown in FIG. 4) according to one embodiment. The process illustrated herein is performed by an instance of the system 400 that is executing in the producer PCE and a functional domain in which the producer offering the service is residing. Various embodiments can perform the steps of FIG. 5 in different orders than those indicated herein. Moreover, other embodiments can include different and/or additional steps than the ones described herein.

The global private communication set-up system 400 monitors 510 a public cloud infrastructure substrate of a PCE for one or more new or updated metadata tags that are associated with a corresponding one or more services offered by one or more producers residing in the PCE. The new or updated metadata tags are published by producers offering services. A producer (and an attached network load balancer, if needed) is located in the functional domain of the public cloud environment within which the system 400 is executing. In some embodiments, the system 400 may monitor the substrate metadata periodically at a prespecified frequency for new or updated metadata tags regarding new or updated tags. In some embodiments, the system 400 may be configured to additionally or alternately receive notifications when a new or updated tag is published in the substrate.

The global private communication set-up system 400 extracts 520 metadata information from an identified metadata tag that is associated with a service offered by a producer based on the monitoring. In some embodiments, the extracted metadata information includes a name that is specified by the producer, and that is used by every consumer requiring access to the offered service. The extracted metadata may include the scope of exposure being offered by the producer regarding the service. For example, the scope may specify exposure to one or more public cloud environments (such as producer PCE 310 and consumer PCE 320 in FIG. 3), to functional domains that may span multiple public cloud environments (such as producer functional domain 330 and consumer functional domain 340 spanning public cloud environments producer PCE 310 and consumer PCE 320 in FIG. 3), to all functional domains within the trusted public cloud environment such as trusted public cloud environment 120 in FIG. 1, or may specify exposure to all functional domains within a region of type device/test/perf, etc. The extracted metadata information may also include parameters of an active probe test that may be used to monitor access to the service by consumers. The system 400 may store the extracted metadata information within a local data store.

The global private communication set-up system 400 configures 530 a producer-side private link service to a private communication link within the public cloud environment and the functional domain in which the system 400 is executing. The configured producer-side private link service is based on the extracted metadata of the new or updated tag. The system 400 uses the name that is in the extracted metadata to create a private DNS record associated with the name. The system 400 configures a private DNS in the producer PCE and functional domain based on the specified name in the extracted metadata. The system 400 creates a tag that is attached to the configured producer-side private link service and includes metadata information about the producer-side private link service in the tag.

The global private communication set-up system 400 publishes 540 the tag that is attached to the producer-side private link service in the substrate of the public cloud infrastructure services. The system 400 displays the tag in the producer PCE's public cloud environment for discovery by instances of system 400 executing in the public cloud environments and functional domains of any consumers requiring access to the services offered by the producer.

The global private communication set-up system 400 that is executing in the PCE and functional domain of the producer ensures that the producer can offering valid, secure, and private access to services for use by a consumer of the service that is located in the same or different PCE and same or different functional domain as the producer through the newly established producer-side private link service in the PCE and functional domain of the producer.

Consumer End Process

FIG. 6 is a flow chart illustrating the process for setting up a communication link to access a resource offered by a producer residing in one public cloud environment (i.e., the producer PCE) by a consumer residing in a different public cloud environment (i.e., the consumer PCE) using a global private communication set-up system 400 (shown in FIG. 4) according to one embodiment. The process illustrated herein is performed by instances of the system 400 that are executing in a functional domain in which the consumer seeking access is located. Since the functional domain in which the consumer is seeking access may span the producer PCE as well as the consumer PCE (e.g., consumer functional domain 340 which spans both consumer PCE 320 and producer PCE 310 in FIG. 3), instances of the system 400 may execute in the consumer functional domain and the producer PCE (e.g., GPCSS 315 in FIG. 3) or in the consumer functional domain and the consumer PCE (e.g., GPCSS 345). The process 600 illustrated herein is responsive to where the instances of the system 400 are executing, and this will be clarified further below. Various embodiments can perform the steps of FIG. 6 in different orders than those indicated herein. Moreover, other embodiments can include different and/or additional steps than the ones described herein.

The global private communication set-up system 400 monitors 610 a public cloud infrastructure substrate of a PCE for new or updated metadata tags that are published in association with private link services offered by one or more producers in the PCE. In some embodiments, the system 400 may monitor the substrate metadata periodically at a prespecified frequency for new or updated metadata regarding new or updated private link service tags. In some embodiments, the system 400 may be configured to additionally or alternately receive notifications when a new or updated tag is published in the substrate metadata.

The global private communication set-up system 400 extracts 620 metadata information from an identified tag regarding a private link service offered by a producer based on the monitoring. In some embodiments, the extracted metadata information includes a name that is specified by the producer, and that is used by every consumer requiring access to the offered private link service. The extracted metadata may include the scope of exposure being offered by the producer regarding the service. For example, the scope may specify exposure to one or more public cloud environments (such as producer PCE 310 and consumer PCE 320 in FIG. 3), functional domains that may span multiple public cloud environments (such as producer functional domain 330 and consumer functional domain 340 spanning public cloud environments producer PCE 310 and consumer PCE 320 in FIG. 3), all functional domains within the trusted public cloud environment such as trusted public cloud environment 120 in FIG. 1, or may specify exposure to all functional domains within a region of type device/ test/perf, etc. The extracted metadata information may also include parameters of an active probe test that may be used to monitor access to the service by customers. The system 400 may store the extracted metadata information within a local data store.

When the global private communication set-up system 400 is executing in the producer PCE (and in the functional domain of the consumer), the system 400 configures 630 a first consumer-side private link endpoint based on the extracted metadata so that the first consumer-side private link endpoint is located within the producer PCE (and the functional domain of the consumer). Furthermore, the first consumer-side private link endpoint resides within a first virtual private cloud (VPC) within the producer PCE.

When the global private communication set-up system 400 is executing in the consumer PCE (and in the functional domain of the consumer), the system 400 configures 640 a second consumer-side private link endpoint based on the extracted metadata so that the second consumer-side private link endpoint is located within the consumer PCE (and the functional domain of the consumer). Furthermore, the second consumer-side private link endpoint resides within a second VPC within the consumer PCE.

The global private communication set-up system 400 executing in the producer PCE leverages 650 native multi-VPC network connectivity capability within the producer PCE to establish connectivity between the first VPC and a VPN tunnel connecting the producer PCE and the consumer PCE. Similarly, the global private communication set-up system 400 executing in the consumer PCE leverages 650 native multi-VPC network connectivity capability within the consumer PCE to establish connectivity between the second VPC and the VPN tunnel connecting the producer PCE and the consumer PCE.

The system 400 executing in the consumer PCE (and in the functional domain of the consumer) uses the specified name in the extracted metadata to create a private DNS record and configure a private DNS in the consumer functional domain and in the consumer PCE based on the specified name to facilitate access to the service offered by the producer. Thus, any consumer that may reside within the consumer functional domain and the consumer PCE may communicate with the producer using this specified name.

The processes described above can be implemented on different types of computer systems, including multi-tenant computer systems. In a multi-tenant computer system, multiple tenants share the use of a computer system, but without access or knowledge to each other's data or activities. Each tenant may be an enterprise. As an example, one tenant might be a company that employs multiple salespersons, where each salesperson uses a client device to manage their sales process. Thus, a user might maintain contact data, leads data, customer follow-up data, performance data, goals and progress data, etc., all applicable to that user's personal sales process.

Computer Architecture

Figure 7:
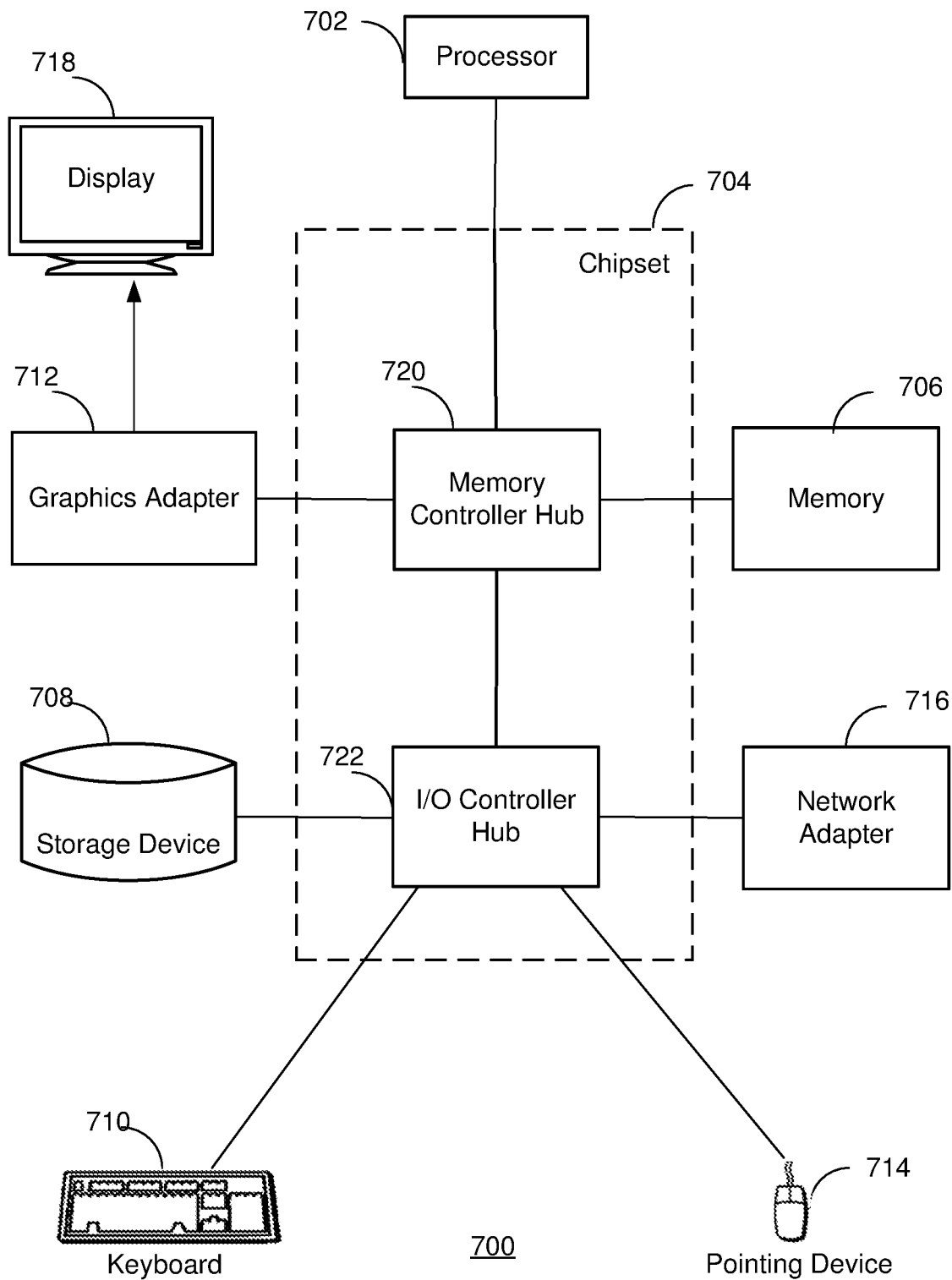
FIG. 7 is a block diagram illustrating the architecture of a typical computer system for use in the environment of FIG. 4 according to one embodiment.

FIG. 7 is a block diagram illustrating the architecture of a typical computer system 700 for use in the environments of FIG. 4 according to one embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is a non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 700. The graphics adapter 712 displays images and other information on the display 718. The network adapter 716 couples the computer system 700 to a network.

As is known in the art, a computer system 700 can have different and/or other components than those shown in FIG. 7. In addition, the computer system 700 can lack certain illustrated components. For example, a computer system 700 acting as an online system 400 may lack a keyboard 710 and a pointing device 714. Moreover, the storage device 708 can be local and/or remote from the computer 700 (such as embodied within a storage area network (SAN)).

The computer system 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 708, loaded into the memory 706, and executed by the processor 702.

The types of computer systems 700 used by the system of FIG. 4 can vary depending upon the embodiment and the processing power used by the entity. For example, a client device may be a mobile phone with limited processing power, a small display 718, and may lack a pointing device 714. The online system 400 in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

We claim:

1. A computer implemented method for providing access across multiple public cloud environments to a service offered by a producer, the method comprising:
    monitoring a first public cloud environment for one or more metadata tags published in association with a corresponding one or more services offered by one or more producers that are residing within the first public cloud environment;
    responsive to the monitoring, extracting metadata from an identified first metadata tag published in association with a service offered by a producer of the one or more producers;
    configuring a producer-side private link service to a private communication link service based on the extracted metadata, wherein the producer-side private link service is located within the first public cloud environment, the producer-side private links being communication links;
    publishing a second metadata tag in the first public cloud environment, wherein the second metadata tag is published in association with the configured producer-side private link service of the private communication link, wherein the private communication link is used to access the service by a consumer residing in a second public cloud environment
    responsive to the consumer residing in the second public cloud environment,
        configuring a second consumer-side private link endpoint to be attached to the consumer residing in the second public cloud environment based on the extracted metadata, wherein the second consumer-side private link endpoint is located within the second public cloud environment, and wherein the second consumer-side private link endpoint resides within a second virtual private cloud (VPC) within the second public cloud environment, the consumer-side private link being a communication link;
        the private communication link connecting the configured producer-side private link service and the configured consumer-side private link endpoint resides in the first public cloud environment;
        using native multi-VPC network connectivity capabilities within the first public cloud environment to establish connectivity between the first consumer-side private link endpoint in the first VPC and a virtual private network (VPN) tunnel, wherein the VPN tunnel provides connectivity between the first public cloud environment and the second public cloud environment; and
    using native multi-VPC network connectivity capabilities within the second public cloud environment to establish connectivity between the second consumer-side private link endpoint in the second VPC and the VPN tunnel.

2. The computer-implemented method of claim 1, wherein monitoring the first public cloud environment for one or more metadata tags comprises at least one of:
    monitoring the first public cloud environment for a new metadata tag; and
    monitoring the first public cloud environment for a metadata tag with updated field values.

3. The computer-implemented method of claim 1, wherein extracting metadata from the identified metadata tag comprises extracting field values from the identified first metadata tag, the field values comprising one or more of:
    name of the service;
    scope of exposure of the service; and
    parameters of an active probe test for the service.

4. The computer-implemented method of claim 3, wherein the scope of exposure of the service comprises at least part of the first public cloud environment and at least part of the second public cloud environment.

5. The computer-implemented method of claim 3, wherein configuring the producer-side private link service to a private communication link service based on the extracted metadata comprises:
    creating a private domain name server (DNS) record based on the name of the service; and
    configuring a private DNS based on created record so that using the name of the service references one of:
        the producer; and
        a network load balancer attached to the producer.

6. The computer-implemented method of claim 1, wherein publishing a second metadata tag associated with the configured producer-side private link service in the first public cloud environment involves creating a tag with metadata information comprising one or more of:
   name of the service;
   scope of exposure of the service; and
   parameters of an active probe test for the service; and
   publishing the created tag in the first public cloud environment.

7. A computer implemented method for facilitating access to a service offered by a producer residing in a first public cloud environment by a consumer residing in a second public cloud environment, the method comprising:
   monitoring, by a system residing in one of: the first public cloud environment or the second public cloud environment, the first public cloud environment for one or more metadata tags published in association with a corresponding one or more configured producer-side private link services of private communication links to services offered by one or more producers, the producer-side private links being communication links;
   responsive to the monitoring, extracting metadata from an identified metadata tag published in association with a configured producer-side private link service of a private communication link to a service offered by a producer;
   responsive to the system residing in the first public cloud environment,
      configuring a first consumer-side private link endpoint to the private communication link based on the extracted metadata, wherein the first consumer-side private link endpoint is located within the first public cloud environment, and wherein the first consumer-side private link endpoint resides within a first virtual private cloud (VPC) within the first public cloud environment, the consumer-side private link being a communication link;
   responsive to the system residing in the second public cloud environment,
      configuring a second consumer-side private link endpoint to be attached to the consumer residing in the second public cloud environment based on the extracted metadata, wherein the second consumer-side private link endpoint is located within the second public cloud environment, and wherein the second consumer-side private link endpoint resides within a second virtual private cloud (VPC) within the second public cloud environment;
   the private communication link connecting the configured producer-side private link service and the configured consumer-side private link endpoint resides in the first public cloud environment;
   using native multi-VPC network connectivity capabilities within the first public cloud environment to establish connectivity between the first consumer-side private link endpoint in the first VPC and a virtual private network (VPN) tunnel, wherein the VPN tunnel provides connectivity between the first public cloud environment and the second public cloud environment; and
   using native multi-VPC network connectivity capabilities within the second public cloud environment to establish connectivity between the second consumer-side private link endpoint in the second VPC and the VPN tunnel.

8. The computer-implemented method of claim 7, further comprising:
   responsive to the system residing in the second public cloud environment,
      configuring a second consumer-side private link endpoint to be attached to the consumer residing in the second public cloud environment based on the extracted metadata, wherein the second consumer-side private link endpoint is located within the second public cloud environment, and wherein the second consumer-side private link endpoint resides within a second virtual private cloud (VPC) within the second public cloud environment.

9. The computer-implemented method of claim 7, wherein the private communication link connecting the configured producer-side private link service and the configured consumer-side private link endpoint resides in the first public cloud environment.

10. The computer-implemented method of claim 7, wherein monitoring the first public cloud environment for one or more metadata tags comprises at least one of:
    monitoring the first public cloud environment for a new metadata tag; and
    monitoring the first public cloud environment for a metadata tag with updated field values.

11. The computer-implemented method of claim 8, further comprising:
    using native multi-VPC network connectivity capabilities within the first public cloud environment to establish connectivity between the first consumer-side private link endpoint in the first VPC and a virtual private network (VPN) tunnel, wherein the VPN tunnel provides connectivity between the first public cloud environment and the second public cloud environment; and
    using native multi-VPC network connectivity capabilities within the second public cloud environment to establish connectivity between the second consumer-side private link endpoint in the second VPC and the VPN tunnel.

12. The computer-implemented method of claim 8, wherein extracting metadata from the identified metadata tag associated with the configured producer-side private link service of the private communication link to the service offered by the producer comprises extracting field values from the identified first metadata tag, the field values comprising one or more of:
    name of the service;
    scope of exposure of the service; and
    parameters of an active probe test for the service.

13. The computer-implemented method of claim 12, wherein configuring the second consumer-side private link endpoint to be attached to the consumer residing in the second public cloud environment based on the extracted metadata comprises:
    creating a private domain name server (DNS) record based on the name of the service; and
    configuring a private DNS based on the DNS created record so that using the name of the service by the consumer will reference the second consumer-side private link endpoint.

14. The computer-implemented method of claim 13, wherein configuring the second consumer-side private link endpoint to be attached to the consumer residing in the second public cloud environment based on the extracted metadata comprises configuring an active probe test based on the extracted parameters.

15. The computer-implemented method of claim 14, wherein the configured active probe test obtains telemetry data comprising one or more of:
  jitter statistics;
  success and failure rate in the consumer-side private link endpoint creation; and
  latency statistics.

16. A computer system storing a non-transitory computer readable storage medium for storing instructions that when executed by a computer processor cause the computer processor to perform steps for facilitating access to a service offered by a producer residing in a first public cloud environment by a consumer residing in a second public cloud environment, the steps comprising:
  monitoring, by a system residing in one of: the first public cloud environment or the second public cloud environment, the first public cloud environment for one or more metadata tags published in association with a corresponding one or more configured producer-side private link services of private communication links to services offered by one or more producers, the producer-side private links being communication links;
  responsive to the monitoring, extracting metadata from an identified metadata tag published in association with a configured producer-side private link service of a private communication link to a service offered by a producer;
  responsive to the system residing in the first public cloud environment,
    configuring a first consumer-side private link endpoint to the private communication link based on the extracted metadata, wherein the first consumer-side private link endpoint is located within the first public cloud environment, and wherein the first consumer-side private link endpoint resides within a first virtual private cloud (VPC) within the first public cloud environment, the consumer-side private link being a communication link;
  responsive to the system residing in the second public cloud environment,
    configuring a second consumer-side private link endpoint to be attached to the consumer residing in the second public cloud environment based on the extracted metadata, wherein the second consumer-side private link endpoint is located within the second public cloud environment, and wherein the second consumer-side private link endpoint resides within a second virtual private cloud (VPC) within the second public cloud environment;
  the private communication link connecting the configured producer-side private link service and the configured consumer-side private link endpoint resides in the first public cloud environment;
  using native multi-VPC network connectivity capabilities within the first public cloud environment to establish connectivity between the first consumer-side private link endpoint in the first VPC and a virtual private network (VPN) tunnel, wherein the VPN tunnel provides connectivity between the first public cloud environment and the second public cloud environment; and
  using native multi-VPC network connectivity capabilities within the second public cloud environment to establish connectivity between the second consumer-side private link endpoint in the second VPC and the VPN tunnel.

17. The computer system of claim 16, the steps further comprising:
  responsive to the system residing in the second public cloud environment,
    configuring a second consumer-side private link endpoint to be attached to the consumer residing in the second public cloud environment based on the extracted metadata, wherein the second consumer-side private link endpoint is located within the second public cloud environment, and wherein the second consumer-side private link endpoint resides within a second virtual private cloud (VPC) within the second public cloud environment.

18. The computer system of claim 17, wherein:
  the private communication link connecting the configured producer-side private link service and the configured consumer-side private link endpoint resides in the first public cloud environment;
  using native multi-VPC network connectivity capabilities within the first public cloud environment to establish connectivity between the first consumer-side private link endpoint in the first VPC and a virtual private network (VPN) tunnel, wherein the VPN tunnel provides connectivity between the first public cloud environment and the second public cloud environment; and
  using native multi-VPC network connectivity capabilities within the second public cloud environment to establish connectivity between the second consumer-side private link endpoint in the second VPC and the VPN tunnel.

19. A computer system comprising:
  a computer processor; and
  a non-transitory computer readable storage medium for storing instructions that when executed by a computer processor cause the computer processor to perform steps for facilitating access to a service offered by a producer residing in a first public cloud environment by a consumer residing in a second public cloud environment, the steps comprising:
    monitoring, by a system residing in one of: the first public cloud environment or the second public cloud environment, the first public cloud environment for one or more metadata tags published in association with a corresponding one or more configured producer-side private link services of private communication links to services offered by one or more producers, the producer-side private links being communication links;
    responsive to the monitoring, extracting metadata from an identified metadata tag published in association with a configured producer-side private link service of a private communication link to a service offered by a producer;
    responsive to the system residing in the first public cloud environment,
      configuring a first consumer-side private link endpoint to the private communication link based on the extracted metadata, wherein the first consumer-side private link endpoint is located within the first public cloud environment, and wherein the first consumer-side private link endpoint resides within a first virtual private cloud (VPC) within the first public cloud environment, the consumer-side private link being a communication link;
    responsive to the system residing in the second public cloud environment, configuring a second consumer-side private link endpoint to be attached to the consumer residing in the second public cloud environment based on the extracted metadata, wherein the second consumer-side private link endpoint is located within the second public cloud environment, and wherein the second consumer-side private link endpoint resides within a second virtual private cloud (VPC) within the second public cloud environment;

the private communication link connecting the configured producer-side private link service and the configured consumer-side private link endpoint resides in the first public cloud environment;

using native multi-VPC network connectivity capabilities within the first public cloud environment to establish connectivity between the first consumer-side private link endpoint in the first VPC and a virtual private network (VPN) tunnel, wherein the VPN tunnel provides connectivity between the first public cloud environment and the second public cloud environment; and using native multi-VPC network connectivity capabilities within the second public cloud environment to establish connectivity between the second consumer-side private link endpoint in the second VPC and the VPN tunnel.

\* \* \* \* \*